US012570174B2

(12) United States Patent
Doi et al.

(10) Patent No.: US 12,570,174 B2
(45) Date of Patent: Mar. 10, 2026

(54) CHARGING SYSTEM, CHARGER, AND CHARGING SYSTEM CONTROL METHOD

(71) Applicant: TOYOTA JIDOSHA KABUSHIKI KAISHA, Aichi-ken (JP)

(72) Inventors: Taiga Doi, Okazaki (JP); Kenji Murasato, Toyota (JP); Tomoya Aoki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 937 days.

(21) Appl. No.: 17/828,035

(22) Filed: May 31, 2022

(65) Prior Publication Data

US 2022/0388419 A1 Dec. 8, 2022

(30) Foreign Application Priority Data

Jun. 2, 2021 (JP) ................................. 2021-092861

(51) Int. Cl.
*B60L 53/62* (2019.01)
*B60L 53/16* (2019.01)

(52) U.S. Cl.
CPC ............... *B60L 53/62* (2019.02); *B60L 53/16* (2019.02); *B60L 2210/10* (2013.01)

(58) Field of Classification Search
CPC ....... B60L 53/62; B60L 53/16; B60L 2210/10
USPC ......................................................... 320/109
See application file for complete search history.

(56) References Cited

U.S. PATENT DOCUMENTS

| | | | | |
|---|---|---|---|---|
| 4,757,250 A * | 7/1988 | Guim | .................... | H02J 7/0034 |
| | | | | 320/105 |
| 6,828,755 B1 * | 12/2004 | Iverson | ............... | H01M 10/613 |
| | | | | 320/104 |
| 7,889,089 B1 * | 2/2011 | Bollin | .................. | G01R 31/343 |
| | | | | 320/134 |
| 9,997,996 B1 * | 6/2018 | Halberstadt | ....... | H02M 3/33546 |
| 11,626,741 B2 * | 4/2023 | Furukawa | ......... | H02J 13/00007 |
| | | | | 320/162 |
| 11,626,810 B1 * | 4/2023 | Sahoo | .................... | H02M 7/537 |
| | | | | 320/128 |

(Continued)

FOREIGN PATENT DOCUMENTS

| | | | | |
|---|---|---|---|---|
| DE | 102010028972 B4 * | 9/2022 | ............. | B60L 3/003 |
| EP | 2463138 B1 | 3/2016 | | |

(Continued)

*Primary Examiner* — Suresh Memula
(74) *Attorney, Agent, or Firm* — HAUPTMAN HAM, LLP

(57) ABSTRACT

A charging system includes: a main battery storing electric power for a vehicle to travel; an inlet connected to a charging connector; a charging relay that switches a path of electric power from the inlet to the main battery; a converter that steps down a voltage of the electric power from the inlet; and an ECU that controls the charging relay and the converter. The ECU: controls the converter so that the converter starts stepping down the voltage of the electric power from the inlet to the auxiliary voltage after receiving the electric power from the inlet; supplies, before the charging relay switches to the connected state, the charging relay with the electric power from the converter as operating power for switching to the connected state; and controls the charging relay so that the charging relay switches from the disconnected state to the connected state, using the operating power.

5 Claims, 4 Drawing Sheets

(56)          References Cited

U.S. PATENT DOCUMENTS

| | | | | | |
|---|---|---|---|---|---|
| 2013/0221920 | A1* | 8/2013 | Sugiyama | | B60L 58/10 |
| | | | | | 320/109 |
| 2014/0028256 | A1* | 1/2014 | Sugiyama | | B60L 53/22 |
| | | | | | 320/109 |
| 2014/0232339 | A1* | 8/2014 | Spani | | B60L 58/22 |
| | | | | | 320/109 |
| 2014/0312828 | A1* | 10/2014 | Vo | | H02J 7/0016 |
| | | | | | 429/7 |
| 2015/0295445 | A1* | 10/2015 | Hasegawa | | H02J 7/342 |
| | | | | | 320/107 |
| 2016/0064979 | A1* | 3/2016 | Huang | | H02J 7/0071 |
| | | | | | 320/114 |
| 2016/0301116 | A1* | 10/2016 | Ochiai | | H01M 10/6563 |
| 2016/0325636 | A1* | 11/2016 | Masuda | | B60L 53/18 |
| 2017/0320396 | A1* | 11/2017 | Kim | | B60L 58/12 |
| 2018/0154778 | A1* | 6/2018 | Ota | | H02J 7/0068 |
| 2020/0070672 | A1* | 3/2020 | Vahedi | | B60L 53/63 |
| 2020/0144840 | A1* | 5/2020 | Masuda | | B60L 50/16 |

| | | | | | |
|---|---|---|---|---|---|
| 2020/0207220 | A1* | 7/2020 | Yamanaka | | H01M 50/50 |
| 2020/0207222 | A1* | 7/2020 | Kanzaki | | B60L 53/22 |
| 2020/0207297 | A1* | 7/2020 | Yamanaka | | B60L 53/11 |
| 2020/0274375 | A1* | 8/2020 | Griffiths | | H02J 7/24 |
| 2021/0376634 | A1* | 12/2021 | Smith | | H02M 7/48 |
| 2023/0219442 | A1* | 7/2023 | Oya | | B60L 58/27 |
| | | | | | 320/109 |
| 2024/0047982 | A1* | 2/2024 | Green | | B60R 16/033 |

FOREIGN PATENT DOCUMENTS

| | | | | | |
|---|---|---|---|---|---|
| EP | 3046198 A1 * | 7/2016 | | | B60L 1/003 |
| JP | 2011-103721 A | 5/2011 | | | |
| JP | 2014-216263 A | 11/2014 | | | |
| JP | 2015-133796 A | 7/2015 | | | |
| JP | 2015-211548 A | 11/2015 | | | |
| JP | 2017160891 A | 9/2017 | | | |
| JP | 202072591 A | 5/2020 | | | |
| WO | 2015/140618 A1 | 9/2015 | | | |
| WO | WO-2021009217 A2 * | 1/2021 | | | B60L 53/22 |

* cited by examiner

CHARGING SYSTEM, CHARGER, AND CHARGING SYSTEM CONTROL METHOD

This nonprovisional application is based on Japanese Patent Application No. 2021-092861 filed on Jun. 2, 2021 with the Japan Patent Office, the entire content of which is hereby incorporated by reference.

BACKGROUND

Field

The present disclosure relates to a charging system, a charger, a charging system control method, and, more particularly, to a charging system which includes a charging relay for switching the path of electric power from an inlet to a main battery between a connected state and a disconnected state; a charger which is connected to the charging relay; and a method for controlling the charging system.

Description of the Background Art

An electric-powered vehicle often includes a main direct-current (DC)-to-direct-current (DC) converter for stepping down the electric power of a main battery for a high-pressure system to drive the vehicle, and supplying the electric power to an auxiliary system (e.g., see Japanese Patent Laying-Open No. 2020-072591). It is conventionally known that a sub DC-to-DC converter, different from the main DC-to-DC converter, is used to supply electric power to the auxiliary system during external charging of the main battery, in view of improvement in efficiency. The sub DC-to-DC converter is a DC-to-DC converter that is separately provided, in the charger, from the main DC-to-DC converter. The sub DC-to-DC converter converts electric power from an external power supply for supply to the auxiliary system.

A circuit for external charging of the electric-powered vehicle often includes a charging relay capable of switching between an electrically-connected state and an electrically-disconnected state between the charger and the main battery. The charging relay operates using the electric power supplied from the auxiliary system. Conventionally, prior to the start of external charging, the charging relay operates using the electric power stored in the auxiliary battery.

SUMMARY

The charging relay switches from the disconnected state to the connected state at least once each time the main battery is externally charged. The more times the charging relay performs the switching operation, the higher the minimum requisite operating voltage for the switching operation increases. Meanwhile, the voltage supplied by the auxiliary battery may be reduced as a function of a state of charge (SOC) of the auxiliary battery when supplied with electric power, and the age of the auxiliary battery. There is a concern that the charging relay may fail to switch to the connected state prior to the start of external charging, if the voltage supplied by the auxiliary battery is not sufficient as the operating voltage of the charging relay.

The present disclosure is made to solve the problem above, and an object of the present disclosure is to provide a charging system, a charger, and a charging system control method, which may prevent the charging relay from failing to switch to the connected state prior to the start of external charging.

A charging system according to the present disclosure includes: a main battery storing electric power for a vehicle to travel; an inlet connected to a charging connector for supplying electric power for charging the main battery; a charging relay that switches a path of electric power from the inlet to the main battery between a connected state and a disconnected state; an inlet-side voltage converter that steps down a voltage of the electric power from the inlet to an auxiliary voltage; and a controller that controls the charging relay and the inlet-side voltage converter. The controller: controls the inlet-side voltage converter so that the inlet-side voltage converter starts stepping down the voltage of the electric power from the inlet to the auxiliary voltage after receiving the electric power from the inlet; supplies, before the charging relay switches to the connected state, the charging relay with the electric power from the inlet-side voltage converter as operating power for switching to the connected state; and controls the charging relay so that the charging relay switches from the disconnected state to the connected state, using the operating power.

According to such a configuration, after electric power is supplied from external power to the vehicle via the inlet and before external charging starts, the inlet-side voltage converter starts stepping down the voltage to the auxiliary voltage; the charging relay is supplied, before switching to the connected state, with the electric power from the inlet-side voltage converter as the operating power for switching to the connected state; and the charging relay switches from the disconnected state to the connected state, using the operating power. As a result, a charging system can be provided which may prevent the charging relay from failing to switch to the connected state prior to the start of external charging.

The charging system may further include an auxiliary battery storing electric power having the auxiliary voltage, wherein the inlet-side voltage converter may be connected in parallel to the auxiliary battery.

The charging system may further include a main battery side power converter that is different from the inlet-side voltage converter and steps down the voltage of the electric power of the main battery to the auxiliary voltage to supply the auxiliary battery with the electric power stored in the main battery.

The controller may control the inlet-side voltage converter so that the inlet-side voltage converter is actuated to supply the charging relay with the operating power, irrespective of a voltage of the auxiliary battery.

The charging system may further include a voltage sensor that senses a voltage of the auxiliary battery, wherein when the voltage sensed by the voltage sensor is less than a predetermined voltage, the controller may control the inlet-side voltage converter so that the inlet-side voltage converter is actuated to supply the charging relay with the operating power.

After the inlet-side voltage converter is actuated, the controller may supply the charging relay with the operating power, when the voltage sensed by the voltage sensor is greater than or equal to the predetermined voltage.

The controller may supply the charging relay with the operating power after a predetermined time period has elapsed since the actuation of the inlet-side voltage converter.

According to another aspect of the present disclosure, a charger includes: a power supply unit that supplies a charging relay, which switches a path of electric power to the main battery between a connected state and a disconnected state, with electric power from an inlet connected to a charging connector for supplying electric power for charging a main battery storing electric power for the vehicle to travel; and an inlet-side voltage converter that steps down a voltage of the electric power from the inlet to an auxiliary voltage. After receiving the electric power from the inlet, the inlet-side voltage converter steps down the voltage of the electric power from the inlet to the auxiliary voltage so as to supply, before the charging relay switches to the connected state, the charging relay with the electric power from the inlet as an operating power for switching to the connected state.

According to such a configuration, a charger can be provided which may prevent the charging relay from failing to switch to the connected state prior to the start of external charging.

According to still another aspect of the present disclosure, in a method for controlling a charging system, the charging system includes: a main battery storing electric power for a vehicle to travel; an inlet connected to a charging connector for supplying electric power for charging the main battery; a charging relay that switches a path of electric power from the inlet to the main battery between a connected state and a disconnected state; an inlet-side voltage converter that steps down a voltage of the electric power from the inlet to an auxiliary voltage; and a controller that controls the charging relay and the inlet-side voltage converter. The method includes: by the controller, controlling the inlet-side voltage converter so that the inlet-side voltage converter starts stepping down the voltage of the electric power from the inlet to the auxiliary voltage after receiving the electric power from the inlet; supplying, before the charging relay switches to the connected state, the charging relay with the electric power from the inlet-side voltage converter as operating power for switching to the connected state; and controlling the charging relay so that the charging relay switches from the disconnected state to the connected state, using the operating power.

According to such a configuration, a charging system control method can be provided which may prevent the charging relay from failing to switch to the connected state prior to the start of external charging.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiment 1

Hereinafter, embodiments according to the present disclosure are described, with reference to the accompanying drawings. In the following description, like reference signs refer to like parts. Their names and functionalities are also the same. Thus, detailed description thereof will not be repeated.

Figure 1:
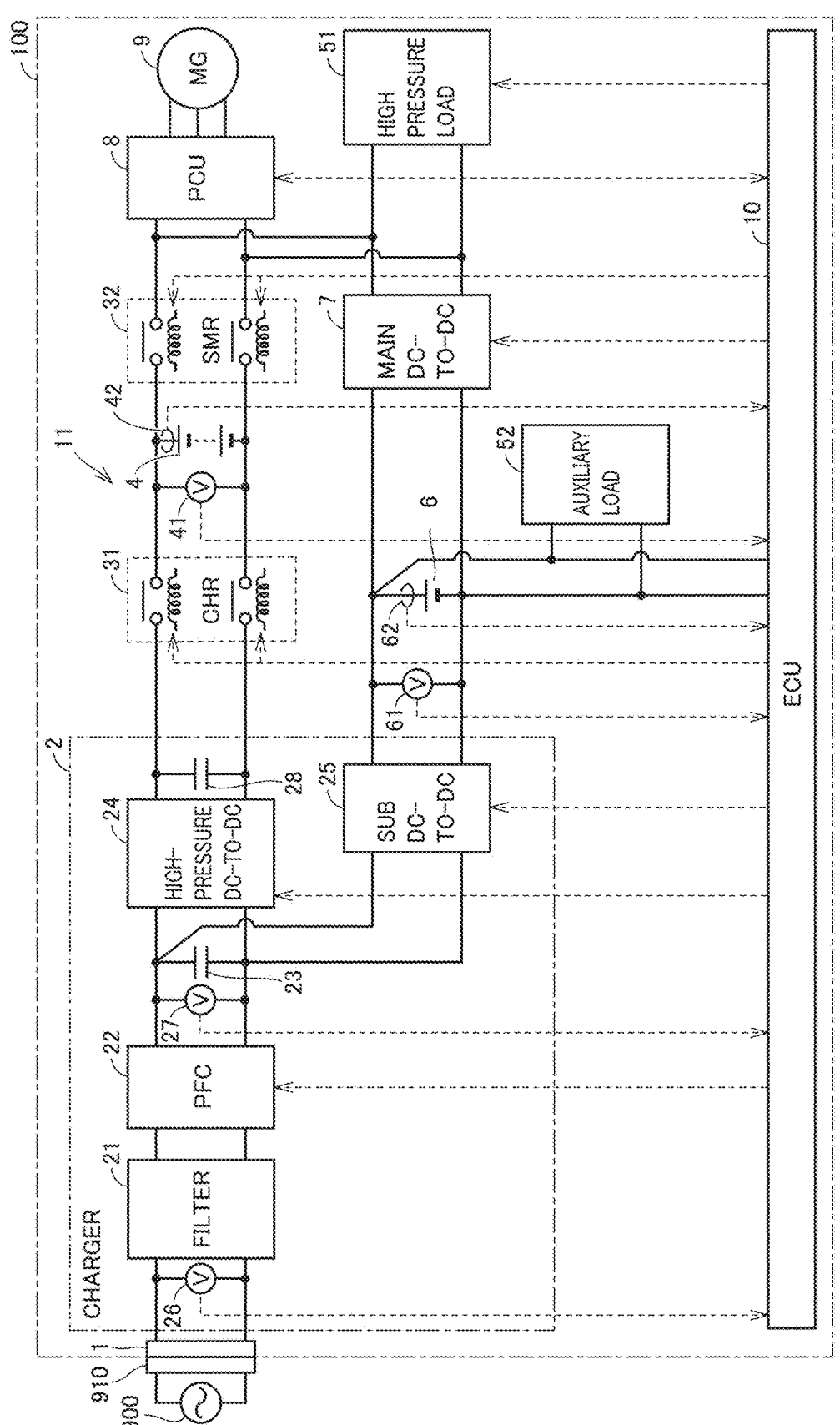
FIG. 1 is a block diagram schematically showing an overall configuration of a vehicle according to an embodiment.

FIG. 1 is a block diagram schematically showing an overall configuration of a vehicle 100 according to the present embodiment. Referring to FIG. 1, the vehicle 100 is capable of external charging with electric power supplied from external equipment 900. The vehicle 100 is a battery electric vehicle in this example. However, the vehicle 100 may be a plug-in hybrid electric vehicle or a fuel cell electric vehicle, etc.

The vehicle 100 includes a charging system 11, a system main relay (SMR) 32, a high pressure load 51, an auxiliary load 52, a power control unit (PCU) 8, a motor generator 9, and an electronic control unit (ECU) 10. The charging system 11 includes an inlet 1, a charger 2, a charging relay 31, a main battery 4, a voltage sensor 41, a current sensor 42, an auxiliary battery 6, a voltage sensor 61, a current sensor 62, a main direct-current (DC)-to-direct-current (DC) converter 7, a sub DC-to-DC converter 25, and an electronic control unit (ECU) 10.

The inlet 1 is connected to a charging connector 910 provided on a tip of a charging cable. The inlet 1 receives alternating-current (AC) power supplied from external equipment 900, such as a charging station, via the charging connector 910. The AC power received by the inlet 1 is transmitted to the charger 2.

The charger 2 includes a filter circuit 21, a power factor correction (PFC) circuit 22, smoothing capacitors 23 and 28, a high-pressure DC-to-DC converter 24, a sub DC-to-DC converter 25, and voltage sensors 26 and 27.

The filter circuit 21 removes noise from the AC power transmitted from the inlet 1, and outputs AC power, having noise removed therefrom, to the PFC circuit 22. The voltage sensor 26 detects a voltage at an input to the charger 2, that is, a voltage to be input to the filter circuit 21, and outputs a result of the detection to the ECU 10.

The PFC circuit 22 is controlled by the ECU 10, rectifies, boosts, and then outputs to the smoothing capacitor 23 the AC power having noise remove therefrom by the filter circuit 21, while making the input current approaching sinusoidal, thereby improving the power factor. Well-known, various types of PFC circuit can be employed as the PFC circuit 22. Note that a rectifier having no power factor improving function may be employed, instead of the PFC circuit 22.

The smoothing capacitor 23 smooths variations in voltage of DC power received from the PFC circuit 22. The smoothed DC power is supplied to the high-pressure DC-to-DC converter 24 and the sub DC-to-DC converter 25. The voltage sensor 27 detects a voltage across the smoothing capacitor 23, that is, a voltage to be supplied to the high-pressure DC-to-DC converter 24 and the sub DC-to-DC converter 25, and outputs a result detection to the ECU 10.

The high-pressure DC-to-DC converter 24 is controlled by the ECU 10 to convert the voltage of the DC power, having being smoothed by the smoothing capacitor 23, to a voltage (e.g., above 200V) suitable for charging the main battery 4.

The smoothing capacitor 28 smooths variations in voltage of the DC power received from the high-pressure DC-to-DC converter 24.

The sub DC-to-DC converter 25 is controlled by the ECU 10 to convert the voltage of the DC power, having being smoothed by the smoothing capacitor 23, to a voltage (e.g., 14V) suitable for charging the auxiliary battery 6.

The charging relay 31 is electrically connected between the high-pressure DC-to-DC converter 24 and the main battery 4. During external charging, the charging relay 31 is, basically, closed in accordance with control commands from the ECU 10. The closed state of the relay will be referred to as a connected state, and the opened state of the relay will be referred to as a disconnected state. This enables the main battery 4 to be supplied with the electric power from the charger 2.

The system main relay 32 is electrically connected between the main battery 4 and the high pressure load 51 and between the main battery 4 and the PCU 8. While the vehicle 100 is traveling, the system main relay 32 is closed in accordance with control commands from the ECU 10. This supplies the high pressure load 51 and the PCU 8 with the electric power from the main battery 4, enabling the motor generator 9 to drive.

The main battery 4 is electrically connected between the charging relay 31 and the system main relay 32. The main battery 4 is an assembled battery formed of multiple cells. Each cell is a secondary battery, such as a lithium-ion battery or a nickel-hydrogen battery. The main battery 4 has a high output voltage of about 200V, for example. The main battery 4 supplies electric power for generating a driving force for the vehicle 100. The main battery 4 also stores electric power obtained by power regeneration by the motor generator 9.

The voltage sensor 41 detects the voltage of the main battery 4 and outputs a result of the detection to the ECU 10. The current sensor 42 detects the current input/output to/from the main battery 4, and outputs results of the detections to the ECU 10. Based on the results of the detections output from the voltage sensor 41 and the current sensor 42, the ECU 10 can calculate a state of charge (SOC) of the main battery 4.

The high pressure load 51 is electrically connected to the main battery 4 via the system main relay 32, and electrically connected to the main DC-to-DC converter 7. For example, the high pressure load 51 can include an air conditioner, a seat heater, and an inverter for an outlet provided inside the vehicle.

The auxiliary load 52 is electrically connected to the auxiliary battery 6. For example, the auxiliary load 52 can include lamps (headlamps, fog lamps, cornering signaling lamps, cornering lamps, etc.), audio equipment, a car navigation system, an antilock brake system (ABS), oil pumps, meters, defoggers, and windshield wipers.

The auxiliary battery 6 is electrically connected between the sub DC-to-DC converter 25 and the main DC-to-DC converter 7. The auxiliary battery 6 is a lithium-ion battery, such as a lead storage battery or a rechargeable battery. The auxiliary battery 6 has a lower output voltage than the main battery 4, for example, about 12V.

The voltage sensor 61 detects the voltage of the auxiliary battery 6, and outputs a result of the detection to the ECU 10. The current sensor 62 detects current input/output to/from the auxiliary battery 6, and outputs results of the detections to the ECU 10. Based on the results of the detections by the voltage sensor 61 and the current sensor 62, the ECU 10 can calculate the SOC of the auxiliary battery 6.

The main DC-to-DC converter 7 is electrically connected between the auxiliary battery 6 and the main battery 4 via the system main relay 32. The main DC-to-DC converter 7 converts a voltage of electric power from the main battery 4 and supplies the auxiliary battery 6 with the electric power having a converted voltage. The main DC-to-DC converter

7 has a larger power capacity (capacity of supplying a current to a load) than the sub DC-to-DC converter 25.

In accordance with control commands from the ECU 10, the PCU 8 converts electric power between the main battery 4 and the motor generator 9. The PCU 8 can include: an inverter that drives the motor generator 9 with supply of electric power from the main battery 4; and a converter that adjusts the level of DC voltage supplied to the inverter, none of which are shown.

The motor generator 9 is an AC rotating electric machine, for example, a permanent-magnet, synchronous motor which includes a rotor having a permanent magnet embedded therein. The output torque of the motor generator 9 is conveyed to the driving wheels via a mechanical power transmission gear configured of a reduction gear and a power split device (none of which are shown), causing the vehicle 100 to travel. Upon regenerative braking of the vehicle 100, the motor generator 9 can generate electric power through the rotational force of the driving wheels. The electric power generated as such is converted by the PCU 8 into electric power for charging the main battery 4.

The ECU 10 includes: a processor, such as a central processing unit (CPU); a memory, such as a read only memory (ROM) and a random access memory (RAM); and input/output ports, none of which are shown. The ECU 10 controls and monitors each device included in the vehicle 100, based on signals received from the sensors above and programs and maps stored in the memory. While FIG. 1 shows an example configuration in which all devices included in the vehicle 100 are controlled by the ECU 10, it should be noted that the ECU 10 may be divided into multiple ECUs by function. Various controls performed by the ECU 10 are not limited to processing by software, and they can be structured in dedicated hardware (electric circuits) and processed.

Conventionally, prior to start of external charging, the charging relay 31 uses electric power stored in the auxiliary battery 6 to operate. The charging relay 31 switches from the disconnected state to the connected state at least once each time the main battery 4 is externally charged. The more times the charging relay 31 performs the switching operation, the higher the minimum requisite operating voltage for the switching operation increases. Meanwhile, the voltage supplied by the auxiliary battery 6 may be reduced as a function of the SOC when supplied with electric power, and the age of the auxiliary battery 6. There is a concern that the charging relay 31 may fail to switch to the connected state prior to the start of external charging, if the voltage supplied by the auxiliary battery 6 is not sufficient as the operating voltage of the charging relay 31.

Thus, the ECU 10: controls the sub DC-to-DC converter 25 so that the sub DC-to-DC converter 25, after receiving the electric power from the inlet 1, starts stepping down the voltage to a voltage suitable for charging the auxiliary battery; supplies, before charging relay 31 switches to the connected state, the charging relay 31 with the electric power output from the sub DC-to-DC converter 25 as the operating power for the charging relay 31 to switch to the connected state; and controls the charging relay 31 so that the charging relay 31 uses the operating power to switch from the disconnected state to the connected state.

This allows: after electric power is supplied from external power to the vehicle 100 via the inlet 1 and before external charging starts, the sub DC-to-DC converter 25 to start stepping down the voltage to a voltage suitable for charging the auxiliary battery 6; the charging relay 31 to be supplied, before switching to the connected state, with the electric power from the sub DC-to-DC converter 25 as the operating power for switching to the connected state; and the operating power to be used by the charging relay 31 to switch from the disconnected state to the connected state. As a result, the charging relay 31 may be prevented from failing to switch to the connected state prior to the start of the external charging.

Figure 2:
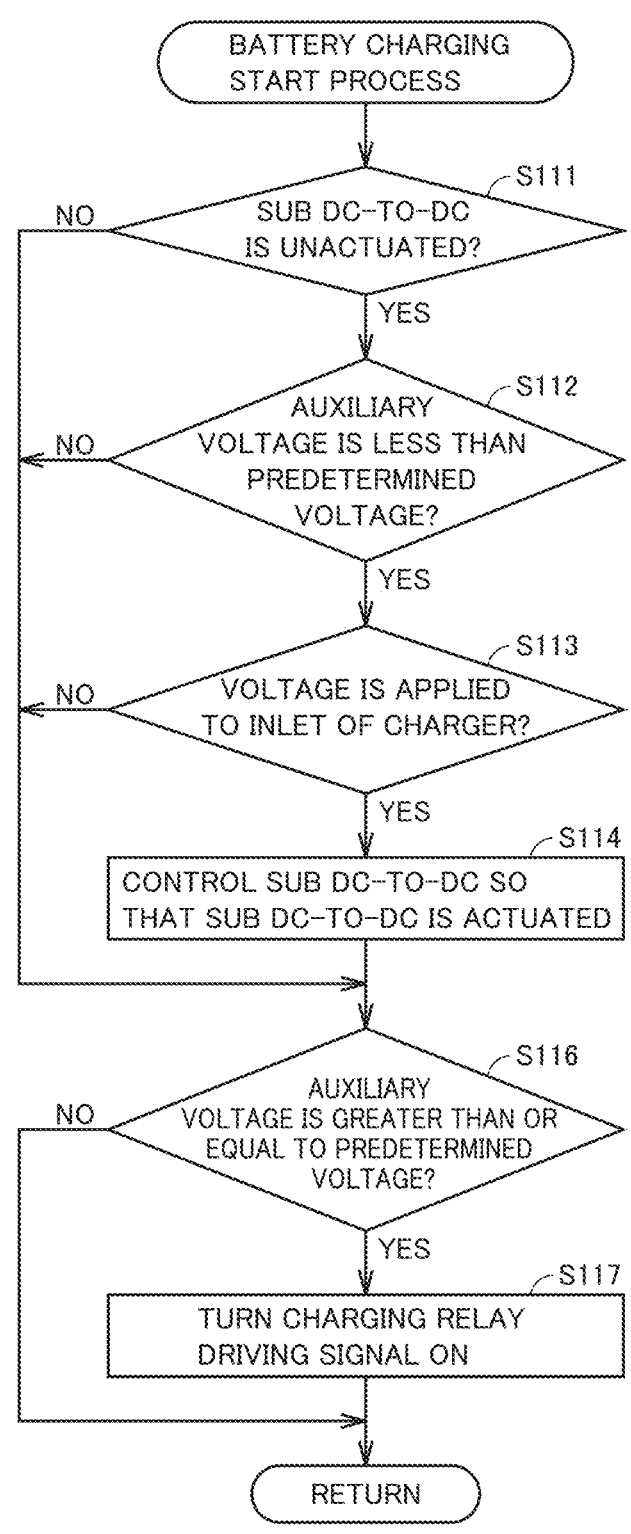
FIG. 2 is a flowchart showing a flow of a battery charging start process according to Embodiment 1.

FIG. 2 is a flowchart showing a flow of a battery charging start process according to Embodiment 1. Referring to FIG. 2, the battery charging start process is invoked and executed from an upper process at predetermined intervals. The CPU included in the ECU 10 determines whether the sub DC-to-DC converter 25 is unactuated (step S111).

If determined that the sub DC-to-DC converter 25 is unactuated (YES in step S111), the CPU included in the ECU 10 determines whether the voltage of the auxiliary battery 6 is less than a predetermined voltage, using a result of the detection by the voltage sensor 61 (step S112). The predetermined voltage is, at least, greater than or equal to a voltage (hereinafter, referred to as "ON voltage") required for the charging relay 31 to switch from the disconnected state to the connected state, for example, a voltage Va shown in FIG. 3 described below.

Figure 3:
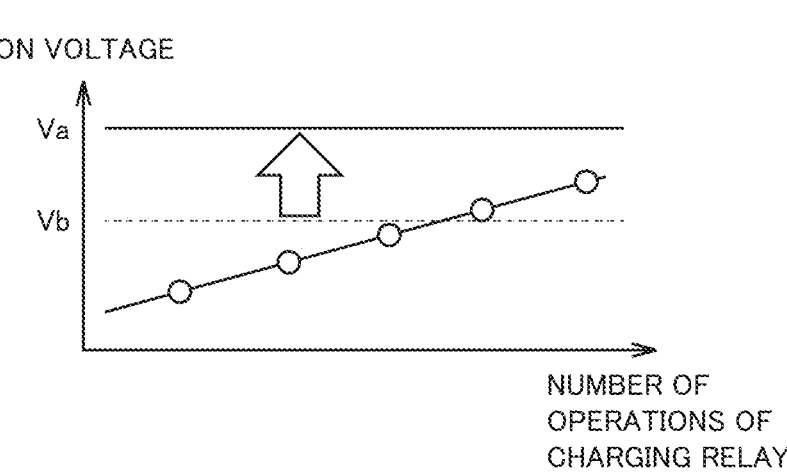
FIG. 3 is a graph of an operating voltage of a charging relay according to the embodiment.

FIG. 3 is a graph of the operating voltage of the charging relay 31 according to the present embodiment. Referring to FIG. 3, the number of operations of the charging relay 31 is indicated on the horizontal axis, and the ON voltage of the charging relay 31 is indicated on the vertical axis. The plots shows transitions of the ON voltage in response to the number of operations of the charging relay 31. As indicated by the line of the graph connecting the plots, the ON voltage tends to increase with an increase in number of operations of the charging relay 31.

If a voltage Vb is supplied to the charging relay 31, a supply voltage Vb at the third plot from the left is greater than the ON voltage responding to the number of operations of the charging relay 31. Therefore, the charging relay 31 can switch from the disconnected state to the connected state. In contrast, the supply voltage Vb at the fourth plot from the left is less than the ON voltage responding to the number of operations of the charging relay 31. Therefore, the charging relay 31 cannot switch from the disconnected state to the connected state.

If the supply voltage is the voltage Va, the supply voltage Va is greater than the ON voltage even if the number of operations of the charging relay 31 increases. Therefore, the charging relay 31 can switch from the disconnected state to the connected state. For this reason, at step S112, the CPU determines whether the voltage of the auxiliary battery 6 fails to switch the charging relay 31 from the disconnected state to the connected state, rather than determining, for example, whether the voltage of the auxiliary battery 6 supplied to the charging relay 31 is less than the voltage Va.

Returning to FIG. 2, if determined that the voltage of the auxiliary battery 6 is less than the predetermined voltage (YES in step S112), the CPU included in the ECU 10 determines whether a voltage is applied to the inlet of the charger 2 by the voltage from the external equipment 900 being applied to the inlet 1, using the result of the detection by the voltage sensor 26 (step S113).

If determined that the voltage is applied to the inlet of the charger 2 (YES in step S113), the CPU included in the ECU 10 controls the sub DC-to-DC converter 25 so that the sub DC-to-DC converter 25 is actuated (step S114). This applies to the auxiliary battery 6 a voltage suitable for charging the auxiliary battery 6. The voltage of the auxiliary battery 6 is supplied to the ECU 10, which, in turn, applies, in response to program execution, the voltage from the auxiliary battery 6 to components to be controlled (e.g., the charging relay 31, the system main relay 32).

If determined that the sub DC-to-DC converter 25 is not unactuated (NO in step S111), if determined that the voltage of the auxiliary battery 6 is not less than the predetermined voltage (NO in step S112), if determined that no voltage is applied to the inlet of the charger 2 (NO in step S113), or after step S114, the CPU included in the ECU 10 determines whether the voltage of the auxiliary battery 6 is greater than or equal to the predetermined voltage (step S116).

Note that if the sub DC-to-DC converter 25 is actuated in step S114 and the voltage of the auxiliary battery 6 thereby increases greater than or equal to the predetermined voltage, step S116 is YES. If the sub DC-to-DC converter 25 is determined to be unactuated in step S111 and the voltage of the auxiliary battery 6 is determined not less than the predetermined voltage in step S112, the sub DC-to-DC converter 25 is not actuated in step S114 but step S116 is YES.

If determined that the voltage of the auxiliary battery 6 is greater than or equal to the predetermined voltage (YES in step S116), the CPU included in the ECU 10 turns the charging relay 31 on, that is, controls the charging relay 31 so that the charging relay 31 switches from the disconnected state to the connected state (step S117). Specifically, by performing this control, the ECU 10 applies the voltage of the auxiliary battery 6 to the charging relay 31 as the operating voltage of the charging relay 31.

If determined that the voltage of the auxiliary battery 6 is not greater than or equal to the predetermined voltage (NO in step S116), and after step S117, the CPU included in the ECU 10 returns the process to the upper process from which the battery charging start process is called.

This increases the voltage for causing the charging relay 31 to operate to be greater than or equal to the predetermined voltage that is required for the charging relay 31 to switch from the disconnected state to the connected state. Consequently, the charging relay 31 can surely switch from the disconnected state to the connected state.

Embodiment 21

In Embodiment 1, the charging relay 31 switches to the connected state when it is determined, by actually detecting the voltage of the auxiliary battery 6, that the voltage supplied to the charging relay 31 is greater than or equal to the predetermined voltage. In Embodiment 2, the voltage supplied to the charging relay 31 is regarded as being greater than or equal to the predetermined voltage after a predetermined time period has elapsed since the start of supply of electric power from the sub DC-to-DC converter 25 to the auxiliary battery 6, and allows the charging relay 31 to switch to the connected state.

Figure 4:
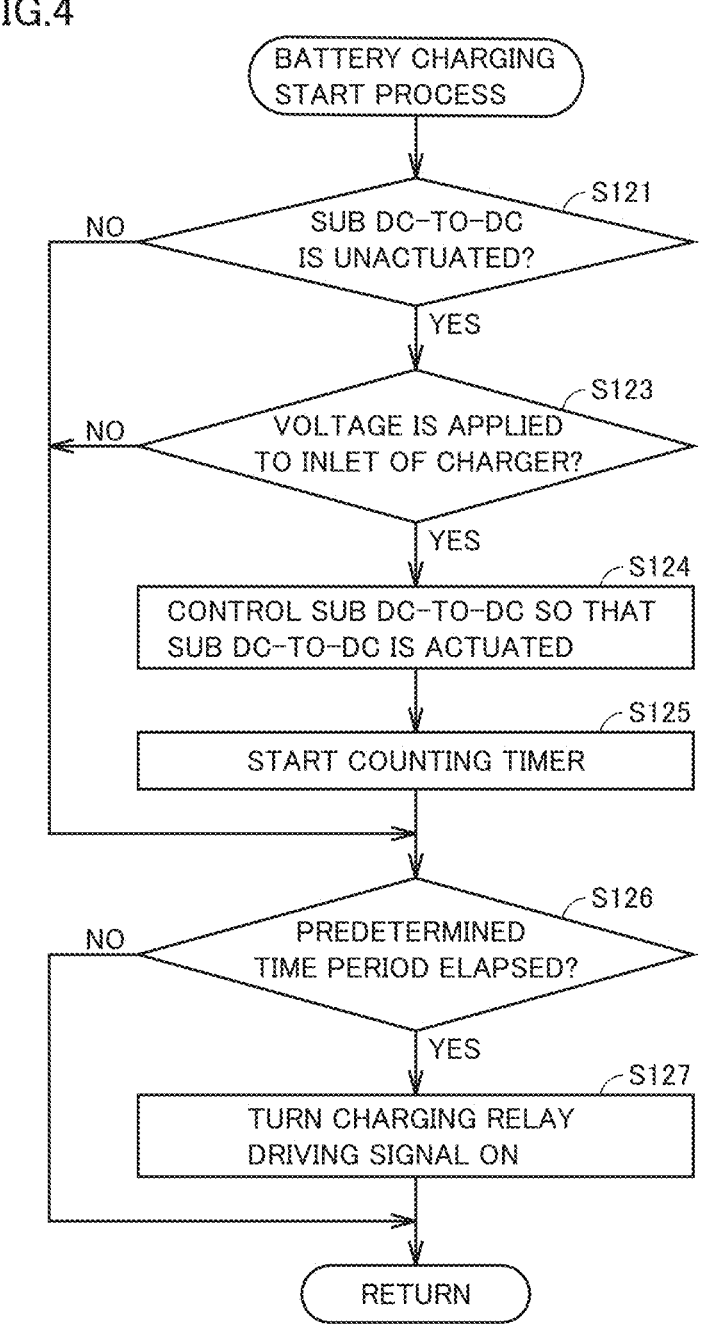
FIG. 4 is a flowchart showing a flow of a battery charging start process according to Embodiment 2.

FIG. 4 is a flowchart showing a flow of a battery charging start process according to Embodiment 2. Referring to FIG. 4, the battery charging start process is invoked and executed from an upper process at predetermined intervals. The process steps S121, S123, and S124 are the same as the process steps S111, S113, and S114 described with respect to FIG. 2, and no redundant descriptions will thus be repeated. After step S124, the CPU included in the ECU 10 starts counting by a timer.

In other words, counting of an elapsed time period starts at a moment the sub DC-to-DC converter 25 applies to the auxiliary battery 6 the voltage suitable for charging the auxiliary battery 6.

The CPU included in the ECU 10 determines whether the elapsed time period being counted by the timer indicates that the predetermined time period has elapsed since the application of the voltage to the auxiliary battery 6 by the sub DC-to-DC converter 25 (step S126). The predetermined time period is sufficiently long for the voltage of the auxiliary battery 6 to be greater than or equal to the predetermined voltage shown in FIG. 2 after the sub DC-to-DC converter 25 applies the voltage to the auxiliary battery 6. In practice, as the sub DC-to-DC converter 25 applies the voltage to the auxiliary battery 6, the voltage of the auxiliary battery 6 soon turns to be equal to the supply voltage by the sub DC-to-DC converter 25. Therefore, the predetermined time period is, at most, about a few minutes.

If the elapsed time period being counted is determined as having elapsed the predetermined time period (YES in step S126), the CPU included in the ECU 10 turns the charging relay 31 on, as with step S117 of FIG. 2, that is, controls the charging relay 31 so that the charging relay 31 switches from the disconnected state to the connected state (step S127). Specifically, by performing this control, the ECU 10 applies the voltage of the auxiliary battery 6 as the operating voltage of the charging relay 31.

If the elapsed time period being counted is determined as not having elapsed the predetermined time period (NO in step S126) and after step S127, the CPU included in the ECU 10 returns the process to the upper process from which the battery charging start process is called.

This increases the voltage for causing the charging relay 31 to operate to be greater than or equal to the predetermined voltage that is required for the charging relay 31 to switch from the disconnected state to the connected state. Consequently, the charging relay 31 can surely switch from disconnected state to the connected state.

[Variations]

(1) In the embodiments described above, the predetermined voltage is constant, as shown in FIGS. 2 and 3. However, the present disclosure is not limited thereto. The predetermined voltage may be increased in response to the number of operations of the charging relay 31. In this case, the predetermined voltage is greater than the ON voltage that responds to the number of operations of the charging relay 31 shown in FIG. 3.

(2) In the embodiments described above, as the voltage of the auxiliary battery 6 or the sub DC-to-DC converter 25 is applied to the ECU 10, the ECU 10 outputs a voltage for switching the charging relay 31, which is a component to be controlled, from the disconnected state to the connected state, as shown in FIG. 1. However, the present disclosure is not limited thereto. A voltage (e.g., 5V) from the ECU 10 may be applied to the base of a transistor and the transistor may thereby apply the voltage of the auxiliary battery 6 or the sub DC-to-DC converter 25 to the charging relay 31.

(3) In the embodiments described above, as shown in FIG. 1, the sub DC-to-DC converter 25 is provided inside the charger 2. However, the present disclosure is not limited thereto. The sub DC-to-DC converter 25 may be provided external to the charger 2.

(4) In the embodiments described above, the charging system 11 includes the auxiliary battery 6, as shown in FIG. 1. However, the present disclosure is not limited thereto. The charging system 11 may not include the auxiliary battery 6.

(5) In the embodiments described above, as shown in FIG. 1, the external power is AC power. However, the present disclosure is not limited thereto. The external power may be DC power.

(6) In the embodiments described above, for example, a solar cell or fuel cell may be connected in parallel between the charger 2 and the charging relay 31 of FIG. 1.

(7) In the embodiments described above, the sub DC-to-DC converter 25 is actuated if the voltage of the auxiliary battery 6 is less than the predetermined voltage at the start of external charging, as illustrated in step S112 of FIG. 2 and step S114. However, the present disclosure is not limited thereto. The sub DC-to-DC converter 25 may be actuated if the voltage for the charging relay 31 to switch from the disconnected state to the connected state is less than an upper limit range of variations in voltage of the auxiliary battery 6, at the start of external charging. Alternatively, the sub DC-to-DC converter 25 may be constantly actuated at the start of external charging.

(8) In the embodiments described above, the charging relay 31 is a relay whose terminals are connected when a voltage is applied to the coil (energized), and disconnected when no voltage is applied to the coil (de-energized). However, the present disclosure is not limited thereto. The charging relay 31 may be a latching relay whose terminals are connected when a voltage is applied to a set coil, and remains the terminals connected even when the voltage is no longer applied. In this case, the terminals are disconnected when a voltage is applied to a reset coil.

(9) In the embodiments described above, at the start of external charging, the voltage of the auxiliary battery 6 is increased by actuating the sub DC-to-DC converter 25, as shown in FIGS. 1 to 4. However, the present disclosure is not limited thereto. At the start of external charging, if the system main relay 32 is in the connected state, the voltage of the auxiliary battery 6 may be increased by actuating the main DC-to-DC converter 7.

(10) The embodiments described above can be considered as the disclosure of the charging system 11, the disclosure of the charger 2, the disclosure of the vehicle 100, or the disclosure of a method or program for controlling the charging system 11, the charger 2, or the vehicle 100.

SUMMARY (1) As shown in FIG. 1, the charging system 11 includes: the main battery 4 storing electric power for the vehicle 100 to travel; the inlet 1 connected to the charging connector 910 for supplying electric power for charging the main battery 4; the charging relay 31 that switches the path of electric power from the inlet 1 to the main battery 4 between the connected state and the disconnected state; the sub DC-to-DC converter 25 that steps down a voltage of the electric power from the inlet 1 to an auxiliary voltage (e.g., a voltage suitable for charging the auxiliary battery 6); and the ECU 10 that controls the charging relay 31 and the sub DC-to-DC converter 25.

As shown in FIGS. 2 and 4, the ECU 10: controls the sub DC-to-DC converter 25 so that the sub DC-to-DC converter 25 starts stepping down the voltage of the electric power from the inlet 1 to the auxiliary voltage after receiving the electric power from the inlet 1 (e.g., step S114 of FIG. 2, step S124 of FIG. 4); supplies, before the charging relay 31 switches to the connected state, the charging relay 31 with the electric power from the sub DC-to-DC converter 25 as an operating power for switching to the connected state (e.g., step S114 of FIG. 2, step S124 of FIG. 4); and controls the charging relay 31 so that the charging relay 31 switches from the disconnected state to the connected state, using the operating power (e.g., step S117 of FIG. 2, step S127 of FIG. 4).

This allows: after electric power is supplied from external power to the vehicle 100 via the inlet 1 and before external charging starts, the sub DC-to-DC converter 25 to start stepping down the voltage to an auxiliary voltage; the charging relay 31 to be supplied, before switching to the connected state, with the electric power from the sub DC-to-DC converter 25 as the operating power for switching to the connected state; and the charging relay 31 switches from the disconnected state to the connected state, using the operating power. As a result, the charging relay 31 may be prevented from failing to switch to the connected state prior to the start of the external charging.

(2) As shown in FIG. 1, the charging system 11 may further include the auxiliary battery 6 storing electric power having the auxiliary voltage, wherein the sub DC-to-DC converter 25 may be connected in parallel to the auxiliary battery 6.

(3) As shown in FIG. 1, the charging system 11 may further include the main DC-to-DC converter 7 which is different from the sub DC-to-DC converter 25 and steps down the voltage of the electric power stored in the main battery 4 to the auxiliary voltage to supply the auxiliary battery 6 with the electric power stored in the main battery 4.

(4) As shown in FIG. 4, the ECU 10 may control the sub DC-to-DC converter 25 so that the sub DC-to-DC converter 25 is actuated to supply the charging relay 31 with operating power, irrespective of the voltage of the auxiliary battery 6 (e.g., step S124).

(5) As shown in FIG. 1, the charging system 11 may further include the voltage sensor 61 that senses the voltage of the auxiliary battery 6. As shown in FIG. 2, if the voltage sensed by the voltage sensor 61 is less than a predetermined voltage (e.g., if step S112 of FIG. 2 is YES), the ECU 10 may control the sub DC-to-DC converter 25 so that the sub DC-to-DC converter 25 is actuated to supply the charging relay 31 with operating power (e.g., step S114 of FIG. 2).

(6) As shown in FIG. 2, after the sub DC-to-DC converter 25 is actuated, when the voltage thereafter sensed by the voltage sensor 61 is greater than or equal to the predetermined voltage (e.g., if step S116 of FIG. 2 is YES), the ECU 10 may supply the charging relay 31 with operating power (e.g., step S117 of FIG. 2).

(7) As shown in FIG. 4, after the predetermined time period has elapsed since the actuation of the sub DC-to-DC converter 25 (e.g., if step S126 of FIG. 4 is YES), the ECU 10 may supply the charging relay 31 with operating power (e.g., step S117 of FIG. 4).

(8) As shown in FIG. 1, the charger 2 includes: the high-pressure DC-to-DC converter 24 that supplies the charging relay 31, which switches the path of electric power to the main battery 4 between the connected state and the disconnected state, with electric power from the inlet 1 connected to the charging connector 910 for supplying electric power for charging the main battery 4 storing electric power for the vehicle 100 to travel; and the sub DC-to-DC converter 25 that steps down the voltage of the electric power from the inlet 1 to the auxiliary voltage (e.g., the voltage suitable for charging the auxiliary battery 6). As shown in FIGS. 2 and 4, after receiving the electric power from the inlet 1, the sub DC-to-DC converter 25 steps down the voltage of the electric power from the inlet 1 to the auxiliary voltage to supply, before the charging relay 31 switches to the connected state, the charging relay 31 with the electric power from the inlet 1 as the operating power for switching to the connected state (e.g., step S114 of FIG. 2, step S124 of FIG. 4).

This can prevent the charging relay 31 from failing to switch to the connected state prior to the start of the external charging.

(9) As shown in FIG. 1, in a method for controlling the charging system 11, the charging system 11 includes: the main battery 4 storing electric power for the vehicle 100 to travel; the inlet 1 connected to the charging connector 910 for supplying electric power for charging the main battery 4; the charging relay 31 that switches the path of electric power from the inlet 1 to the main battery 4 between the connected state and the disconnected state; the sub DC-to-DC converter 25 that steps down the voltage of the electric power from the inlet 1 to the auxiliary voltage (e.g., the voltage suitable for charging the auxiliary battery 6); and the ECU 10 that controls the charging relay 31 and the sub DC-to-DC converter 25.

As shown in FIGS. 2 and 4, the method includes: by the ECU 10, controlling the sub DC-to-DC converter 25 so that the sub DC-to-DC converter 25 starts stepping down the voltage of the electric power from the inlet 1 to the auxiliary voltage after receiving the electric power from the inlet 1 (e.g., step S114 of FIG. 2, step S124 of FIG. 4); supplying, before the charging relay 31 switches to the connected state, the charging relay 31 with the electric power from the sub DC-to-DC converter 25 as the operating power for switching to the connected state (e.g., step S114 of FIG. 2, step S124 of FIG. 4); and controlling the charging relay 31 so that the charging relay 31 switches from the disconnected state to the connected state, using the operating power (e.g., step S117 of FIG. 2, step S127 of FIG. 4).

This can prevent the charging relay 31 from failing to switch to the connected state prior to the start of the external charging.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging system, comprising:

a main battery storing electric power for a vehicle to travel;

an inlet connected to a charging connector for supplying electric power for charging the main battery;

a charging relay that switches a path of electric power from the inlet to the main battery between a connected state and a disconnected state;

an inlet-side voltage converter that steps down a voltage of the electric power from the inlet to an auxiliary voltage;

a controller that controls the charging relay and the inlet-side voltage converter, wherein the controller:

controls the inlet-side voltage converter so that the inlet-side voltage converter starts stepping down the voltage of the electric power from the inlet to the auxiliary voltage after receiving the electric power from the inlet;

supplies, before the charging relay switches to the connected state, the charging relay with the electric power from the inlet-side voltage converter as operating power for switching to the connected state; and controls the charging relay so that the charging relay switches from the disconnected state to the connected state, using the operating power;

an auxiliary battery storing electric power having the auxiliary voltage, wherein the inlet-side voltage converter is connected in parallel to the auxiliary battery; and a voltage sensor that senses a voltage of the auxiliary battery, wherein when the voltage sensed by the voltage sensor is less than a predetermined voltage, the controller controls the inlet-side voltage converter so that the inlet-side voltage converter is actuated to supply the charging relay with the operating power, wherein after the inlet-side voltage converter is actuated, the controller supplies the charging relay with the operating power, when the voltage sensed by the voltage sensor is greater than or equal to the predetermined voltage.

2. The charging system according to claim 1, further comprising a main battery side power converter that is different from the inlet-side voltage converter and steps down the voltage of the electric power of the main battery to the auxiliary voltage to supply the auxiliary battery with the electric power stored in the main battery.

3. The charging system according to claim 1, wherein the controller controls the inlet-side voltage converter so that the inlet-side voltage converter is actuated to supply the charging relay with the operating power, irrespective of a voltage of the auxiliary battery.

4. A charger, comprising:

a power supply unit that supplies a charging relay, which switches a path of electric power to a main battery between a connected state and a disconnected state, with electric power from an inlet connected to a charging connector for supplying electric power for charging the main battery storing electric power for a vehicle to travel;

an inlet-side voltage converter that steps down a voltage of the electric power from the inlet to an auxiliary voltage, wherein after receiving the electric power from the inlet, the inlet-side voltage converter steps down the voltage of the electric power from the inlet to the auxiliary voltage so as to supply, before the charging relay switches to the connected state, the charging relay with the electric power from the inlet as an operating power for switching to the connected state;

an auxiliary battery storing electric power having the auxiliary voltage, wherein the inlet-side voltage converter is connected in parallel to the auxiliary battery; and a voltage sensor that senses a voltage of the auxiliary battery, wherein when the voltage sensed by the voltage sensor is less than a predetermined voltage, the inlet-side voltage converter is actuated to supply the charging relay with the operating power, wherein after the inlet-side voltage converter is actuated, the charging relay is supplied with the operating power, when the voltage sensed by the voltage sensor is greater than or equal to the predetermined voltage.

5. A method for controlling a charging system, the charging system including:

a main battery storing electric power for a vehicle to travel;

an inlet connected to a charging connector for supplying electric power for charging the main battery;

a charging relay that switches a path of electric power from the inlet to the main battery between a connected state and a disconnected state;

an inlet-side voltage converter that steps down a voltage of the electric power from the inlet to an auxiliary voltage;

an auxiliary battery storing electric power having the auxiliary voltage, wherein the inlet-side voltage converter is connected in parallel to the auxiliary battery;

a voltage sensor that senses a voltage of the auxiliary battery; and a controller that controls the charging relay and the inlet-side voltage converter, the method, comprising:

by the controller, controlling the inlet-side voltage converter so that the inlet-side voltage converter starts stepping down the voltage of the electric power from the inlet to the auxiliary voltage after receiving the electric power from the inlet;

supplying, before the charging relay switches to the connected state, the charging relay with the electric power from the inlet-side voltage converter as operating power for switching to the connected state;

controlling the charging relay so that the charging relay switches from the disconnected state to the connected state, using the operating power;

when the voltage sensed by the voltage sensor is less than a predetermined voltage, actuating the inlet-side voltage converter to supply the charging relay with the operating power; and after the inlet-side voltage converter is actuated, supplying the charging relay with the operating power, when the voltage sensed by the voltage sensor is greater than or equal to the predetermined voltage.

* * * * *